United States Patent
Preece

(10) Patent No.: US 9,400,731 B1
(45) Date of Patent: Jul. 26, 2016

(54) FORECASTING SERVER BEHAVIOR

(71) Applicant: Amazon Technologies, Inc., Reno, NV (US)

(72) Inventor: Eric Scott Preece, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 105 days.

(21) Appl. No.: 14/260,085

(22) Filed: Apr. 23, 2014

(51) Int. Cl.
 *G06F 11/00* (2006.01)
 *G06F 11/34* (2006.01)

(52) U.S. Cl.
 CPC ........ *G06F 11/3409* (2013.01); *G06F 11/3447* (2013.01); *G06F 11/3452* (2013.01)

(58) Field of Classification Search
 CPC .................. G06F 11/3447; G06F 11/3452
 See application file for complete search history.

(56) References Cited

U.S. PATENT DOCUMENTS

| | | | | |
|---|---|---|---|---|
| 6,377,907 | B1 * | 4/2002 | Waclawski | G06F 11/3452 702/179 |
| 6,557,035 | B1 * | 4/2003 | McKnight | G06F 11/3452 709/202 |
| 2003/0139905 | A1 * | 7/2003 | Helsper | G06F 11/3006 702/182 |
| 2004/0133395 | A1 * | 7/2004 | Ding | G06F 11/3452 702/182 |
| 2005/0114739 | A1 * | 5/2005 | Gupta | G06F 11/008 714/39 |
| 2008/0033991 | A1 * | 2/2008 | Basak | G06F 11/3442 |
| 2008/0126881 | A1 * | 5/2008 | Bruckhaus | G06F 11/008 714/47.2 |
| 2009/0249129 | A1 * | 10/2009 | Femia | G06F 11/008 714/47.2 |
| 2011/0231582 | A1 * | 9/2011 | Uysal | G06F 11/008 710/15 |

* cited by examiner

Primary Examiner — Yolanda L Wilson
(74) Attorney, Agent, or Firm — Baker & Hostetler LLP

(57) ABSTRACT

In a computing environment, common attributes of one or more computing resources are identified for which a predicted probability of an event associated with the one or more computing resources is to be determined. A first predicted probability of the event based on data associated with actual occurrences of the events is calculated. A second predicted probability of the event is calculated based on updated data associated with the event.

20 Claims, 5 Drawing Sheets

FORECASTING SERVER BEHAVIOR

BACKGROUND

A data center is a facility that houses computer systems and various networking, storage, and other related components. Data centers may, for example, provide computing services to businesses and individuals as a remote computing service or to provide "software as a service" (e.g., cloud computing). When a failure of a component occurs, customers may lose data and may be unable to provide services to their downstream customers, resulting in lost revenue and customer dissatisfaction.

BRIEF DESCRIPTION OF DRAWINGS

References are made to the accompanying drawings that form a part hereof, and that show, by way of illustration, specific embodiments or examples. The drawings herein are not drawn to scale. Like numerals represent like elements throughout the several figures. In the figures, reference numbers may be reused to indicate correspondence between referenced elements. The drawings are provided to illustrate example embodiments described herein and are not intended to limit the scope of the disclosure.

DETAILED DESCRIPTION

Figure 1:
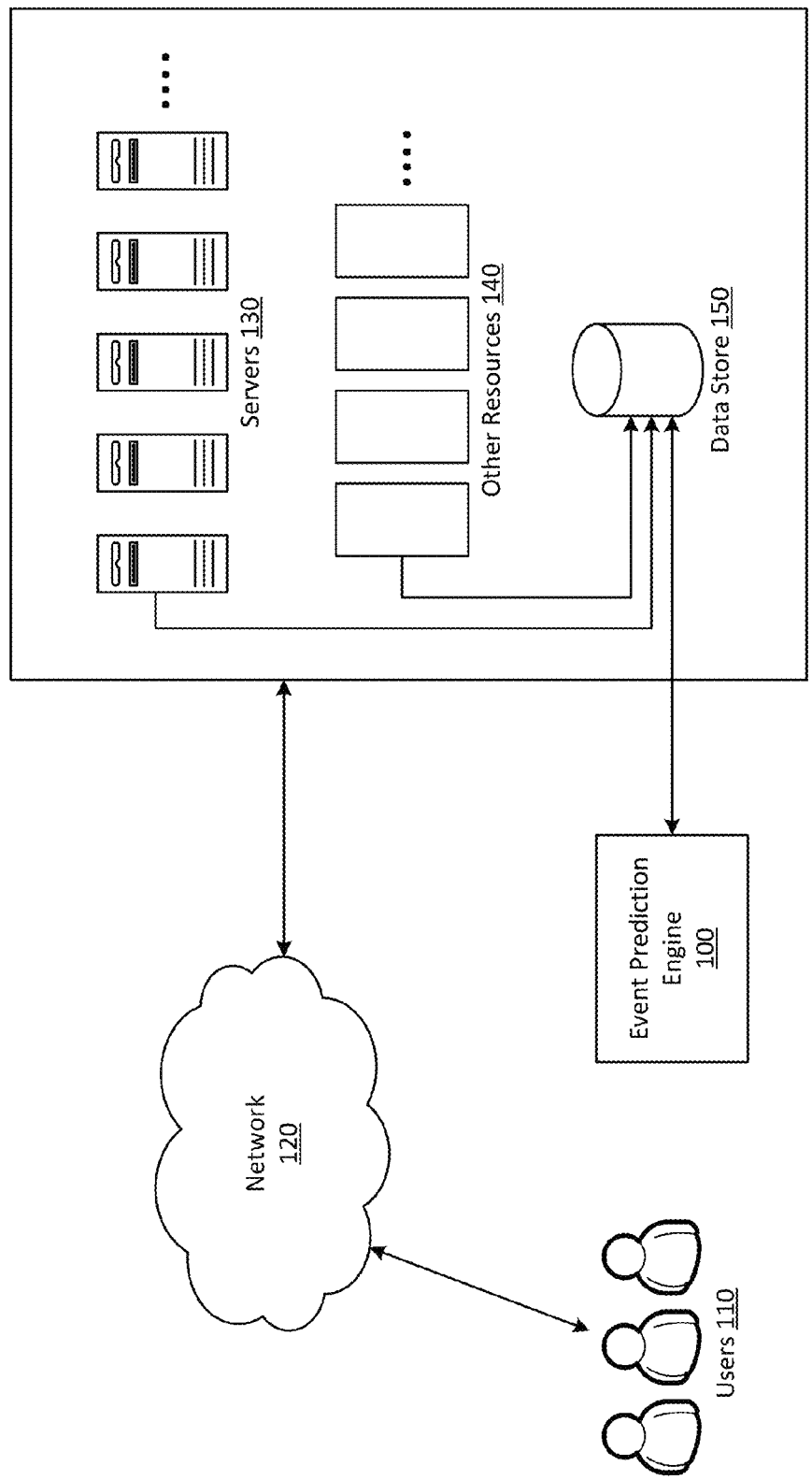
FIG. 1 is a diagram illustrating a mechanism for managing computing resources in accordance with the present disclosure.

A data center may house many thousands of components such as servers and storage devices. When a device fails, troubleshooting the problem can be a complex process due to the significant amount of data that must be evaluated. Computing environments in a data center can include a vast number of interconnected devices. Technologies such as virtualization can increase this complexity. The computing environments may include a mix of various types of data flowing through both virtual and physical components. Computing devices such as servers and routers may have complex interactions, and behaviors in one area can affect the performance of the entire computing environment. Metrics or benchmarks may include performance metrics that indicate how the computing environment is performing. Such performance metrics may include throughput, latency, and data loss. Thus, data of various kinds—such as log files, work flow data, metrics, customer traffic analysis and usage logs, and configurations of the load balancers—must be evaluated to troubleshoot failures.

Even when the cause of a problem is found, the loss of the device may result in lost data, down time, and customer dissatisfaction. It would be useful to predict failure of a device before a failure actually occurs, allowing the service provider to take preemptive measures, such as bringing another device on-line, and thus avoiding problems associated with an unexpected loss of a device. In various embodiments, this disclosure describes methods and systems for predicting future device failures. In one embodiment, Bayesian methods are employed to calculate the probability of a failure given a prior probability and update the prior probability with data to yield a posterior probability. The service provider may use existing data about its deployed devices to calculate the prior probability of failure based on calculating the percentage of devices that have already experienced a failure. The data may be drawn based on common attributes, such as physical location, hardware, and installed software. The posterior probability may be calculated for a single device as well as for a group of devices using a distribution function, which can be derived using the device attribute data.

The probabilities may be updated over time as new data becomes available. For example, if a forecasted failure does not occur, then that data may be fed back into the model via a new value for the prior probability, and a new posterior probability may be calculated. Similarly, if a forecasted failure does occur, this data may also be fed back into the model and a new posterior probability may be calculated. In this way, a model capable of accurately predicting device failures can be implemented.

While the present disclosure describes examples in terms of servers and server failures, it should be understood that the disclosed principles may be applied to other types of devices and to predicting other types of events. For example, an event can be any type of system impairment, such as loss of network connectivity or failure to respond within a specified time limit.

FIG. 1 is a diagram illustrating an event prediction engine 100 for providing event predictions in accordance with the present disclosure. In FIG. 1, a data center may include resources and applications that may execute, for example, on one or more servers 130. It will be appreciated that some embodiments may involve additional resources 140 of various types that may be provided.

FIG. 1 also illustrates a network 120 that may include one or more computers accessible by users 110. According to one embodiment, resources executing on servers 130 may be configured to provide computing services to users 110 via network 120. For example, a resource may provide a set of remote access enterprise applications to a group of users who may, for example, be employees of an enterprise customer. FIG. 1 also illustrates a data store 150 that may store data pertaining to various events and metrics for servers 130 and resources 140.

A request may be sent to an event prediction engine 100 for monitoring and analyzing one or more of the user's allocated resources and associated load balancing functions. In some embodiments, a request may be received from a user 110 for event probabilities. In other embodiments, the request may be received from one or more services at the service provider. In response to receipt of the request, event prediction engine 100 may log the request and provide updates as to the status of the request. The event prediction engine 100 may communicate with other services to facilitate: (1) processing of the request, (2) collection of data pertaining to request, and (3) generating interfaces to provide results of the request. The event prediction engine 100 may, for example, provide an interface for facilitating submission of the request. The event prediction engine 100 may further provide an interface for viewing the results of the request and modifying or cancelling the request.

Event prediction engine 100 may be configured to provide analysis and diagnostics for providing predicted event probabilities based on real time or accumulated and/or archived monitoring of various devices. The monitored resources may include instances of various types, such as reserved instances and on-demand instances as discussed above. The monitored resources may also include other computing resources provided by the service provider, such as storage services. The event prediction engine 100 may access metrics, such as CPU utilization, data transfers, and disk usage activity. The event prediction engine 100 may be made accessible via an application programming interface (API) or a user interface that may be accessed via a Web browser or other input mechanisms.

Trouble-shooting a device failure may be difficult for the following reasons:

(1) Performing the trouble-shooting may require a wide range of knowledge.

(2) Performing the trouble-shooting is typically based on partial information. Information is usually incomplete due to the desired information being unavailable to a tool that is used in trouble-shooting (e.g., the information is located outside of the system that performs the troubleshooting).

(3) Performing the trouble-shooting may require experience to know what missing information needs to be collected. Gathering every piece of missing information may be time-consuming and may also ultimately be unnecessary in the trouble-shooting process.

One way to address the above issues is to implement ways to predict future device failures. For example, Bayes' theorem may be used to calculate the probability of an event given two pieces of data: the belief that the event will occur (called the prior probability) and the likelihood that it will occur. The result of the calculation will yield what is called the posterior probability. In one embodiment, existing data about a current set of devices may be used to calculate the prior probability with a known degree of certainty. The calculation may be based on the percentage of devices that have already had the event occur. In one embodiment, a sample set of devices (e.g., servers) may be defined by common attributes, such as physical location, hardware, software installed, and other factors. Once a sample is defined, the prior probability may be calculated based on known failure rates of the sample set of devices.

After calculation of the prior probability, or the initial likelihood of an event, the posterior probability can be calculated as additional data is gathered and made available. The posterior probability can be calculated for a single device or can be calculated for a group of devices using a distribution function. The distribution function can be derived, for example, using the device's attribute data along the x-axis.

By using Bayes' theorem to update the event probability, the posterior probability can be updated as new data becomes available. For example, if a forecasted event does not occur, this data may be fed back into the model and a new value for the prior probability and a new posterior probability may be calculated. Similarly, if a forecasted event does indeed occur, this information may be fed back into the model and a new posterior probability may be calculated.

In one embodiment, the probabilities may be updated at specified time intervals, where real-time posterior probabilities may be calculated that include events during the previous interval. In this way, an accurate model for predicting device events may be implemented. The predications may be further updated by comparing the prediction model to the actual observed behavior.

In some embodiments, an expert system that utilizes logical inferences based on the available information may be used. An expert system may take available information pertaining to actual failures of devices and use the information as input to a rules-based system to generate updated event probabilities. The available information may be provided to a Bayesian process to determine an updated probability for the event.

Within this operating environment, event prediction engine 100 may determine a predicted probability of an event, such as a predicted failure of a server. Event prediction engine 100 may gather data from other components of the operating environment, such as data store 150. Data store 150 may collect information from servers 130 and other resources 140, among others. The event prediction engine 100 may also collect information stored in log files and other locations. The information may also be obtained by querying devices for data that is not currently being stored in a log file.

In some cases, event prediction engine 100 may not have access to all available data for the relevant devices because doing so would take too much time, would require too much storage space to store, or some of the data may have been determined to have a low likelihood of being relevant to determining the event rate for the device of interest. In other cases, some of the data may be configured only to be accessible manually or may be unavailable because the data is on a network segment to which the event prediction engine 100 does not have access. The event prediction engine 100 may use the available information to determine an initial probability for an event and update the probability as more information becomes available.

Bayesian probability techniques are used to determine initial (prior) and updated (posterior) probabilities for events. As an example, the failure rate for a server may be determined to be 1%/month based on a historical failure rate for all servers for a particular provider. Without knowing anything other than that this is a server, the probability for this hypothetical is a 1% chance that the server will fail within one month. If it is also known that the server is located in North Carolina, then an additional piece of information that is known may be that servers in North Carolina have a 3% chance of failure within one month. This may be identified as P(S|N)=0.03 (which expresses that the probability of a failure event "server fails" given the data "server is located in North Carolina" is true is 3%).

In this example, P(S) is what is known about the probability of a server failure without factoring in the location of the server and may be referred to as the prior probability in Bayesian terminology. Then P(S|N) is the likelihood of a server failure if the server is located in North Carolina is factored in and may be referred to as the posterior probability in Bayesian terminology.

After the probability has been calculated, information regarding the predicted event rate may be returned to the user who requested information about the event. The predicted event rate based on the most recent information may be provided. Additionally, updates to the predicted event rate may be provided if new information that affects the calculation is made available. In some embodiments, the source of the event—if the event is, for example, a failure—may also be provided. This may also comprise identifying a remedy to the potential source of the failure.

In some embodiments, the probability analysis may be performed based on machine learning via a machine learning system that includes one or more learning functions that learns the probabilities associated with the availability of various data that may be relevant to the determination of the event rate. This probability analysis may also be performed based on history data of prior probability analyses, or performed based on a user indication of a rule to be used in the probability calculation.

In some embodiments, the event prediction engine 100 may monitor events and device attributes automatically. For example, the service provider may monitor a number of preselected events collected or determined at a predetermined frequency. Additional event data may be collected at the same or different frequencies as specified by the service provider. It should be understood that the event data may be collected for any of the computing resources provided by the service provider including servers, databases, storage, and the like.

Additionally, the event prediction engine 100 may provide users with the ability to request and receive notifications or to take specified actions depending on the events. For example, the service provider may migrate data from a server that is predicted to fail and shut down the server. In some embodiments, the event data may be retained for a predetermined time to allow users to retrieve historical metric data for review and analysis. A user interface may be provided to allow access to the event prediction engine 100.

In some embodiments, a time frame for the event prediction may be specified as well as the resources to be evaluated. For example, a user may want to determine the predicted failure rate for a bank of servers over a period of one month.

The event prediction engine 100 may provide a detailed analysis and summary of results to the requesting user. In some embodiments, the identification of one or more causes of a predicted event, such as a failure, may be accompanied by suggested solutions to the identified issues. If the source of an identified issue is at the service provider, then a summary of recommended actions to be taken by the service provider may be provided.

In some embodiments, an API may be provided to facilitate requests for predicted event information. For example, an API can be called with information such as a device identifier, event start time, and event end time. After the API is called, in one embodiment the event prediction engine 100 may take actions such as:

Access activity logs for the device.
Retrieve configuration data of related devices.
Call available APIs that can provide metrics for the devices.
Invoke a probability determination function to generate the predicted probability of an event.

Using the gathered information, the event prediction engine 100 may analyze the data, combine or aggregate the data or extract portions of the data as appropriate, and invoke the probability determination function to generate the predicted probability of an event. The determined event probability may be reported through the API along with details regarding potential causes for the event prediction.

When a user is initiating a request for an event prediction, the API may return metadata about the device associated with the request. A request identifier may be generated to track and process the request.

Figure 2:
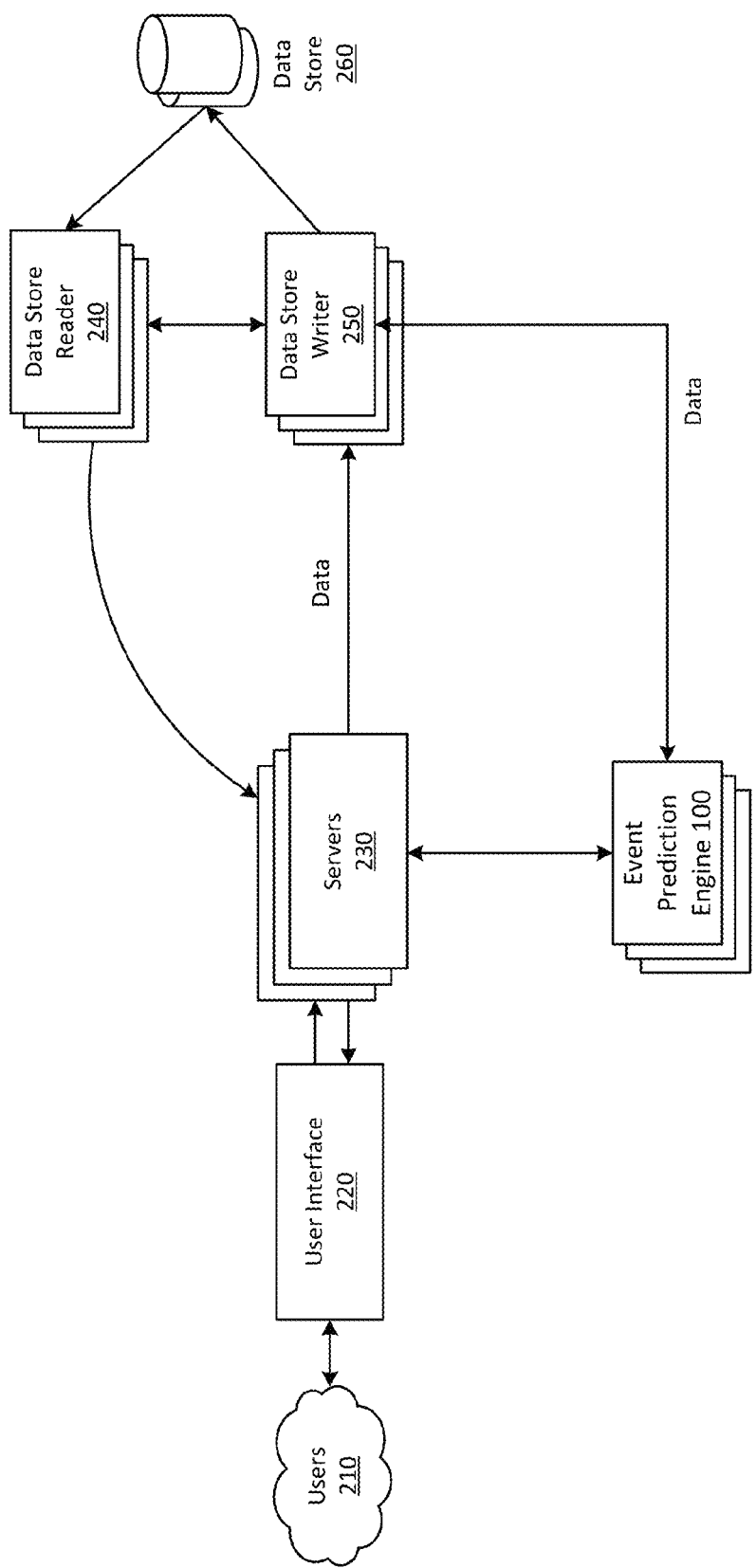
FIG. 2 is a diagram illustrating an example system for managing computing resources in accordance with the present disclosure.

Referring to FIG. 2, illustrated is an example implementation of functionality associated with the event prediction engine 100. The event prediction engine 100 may access, or cause access to, various data such as metrics and event histories. The event prediction engine 100 may also generate or cause the generation of data. Users 210 of the service provider may access a user interface 220 for requesting data. In some embodiments, the user interface 220 can be generated by functions implemented in software executing on one or more servers 230. The requested metric data may be provided to a data store writer 250 that may store the data. A data store reader 240 may be configured to access the data store 260 and retrieve data based on requests from the users 210 or for other purposes. The event prediction engine 100 may manage the various data that are to be collected. For example, the event prediction engine 100 may take actions such as invoke a service to generate a set of available metrics pertaining to the request and the associated device. The event prediction engine 100 may also access activity logs for the device, health status for the device, connection states for the device, configurations for the device, and hardware attributes (e.g., server manufacturer, RAM manufacturer, etc.). Other types of data may be accessed as determined by the event prediction engine 100, such as the type of resource running on a device, type of hardware, physical location, installed software, what customers are associated with the device, and so on.

In some embodiments, attributes of the device can be selected based on biasing to identify attributes that may have greater impact on the probability calculation. For example, data for an initial set of attributes can be weighted to indicate relevance of the attributes to the desired event. The weighting can be continuously updated to increase the accuracy of the biasing.

In some embodiments, an API or a programming interface sub-system may be provided for facilitating the submission of event prediction requests. The API may be configured to receive electronic messages that encode identifiers indicative of an event prediction request for fulfillment by the event prediction engine 100. In response to receiving one of the electronic messages, the API may send second electronic messages indicative of information indicating that an event prediction request has been received and may provide the results of the event prediction calculation.

Figure 3:
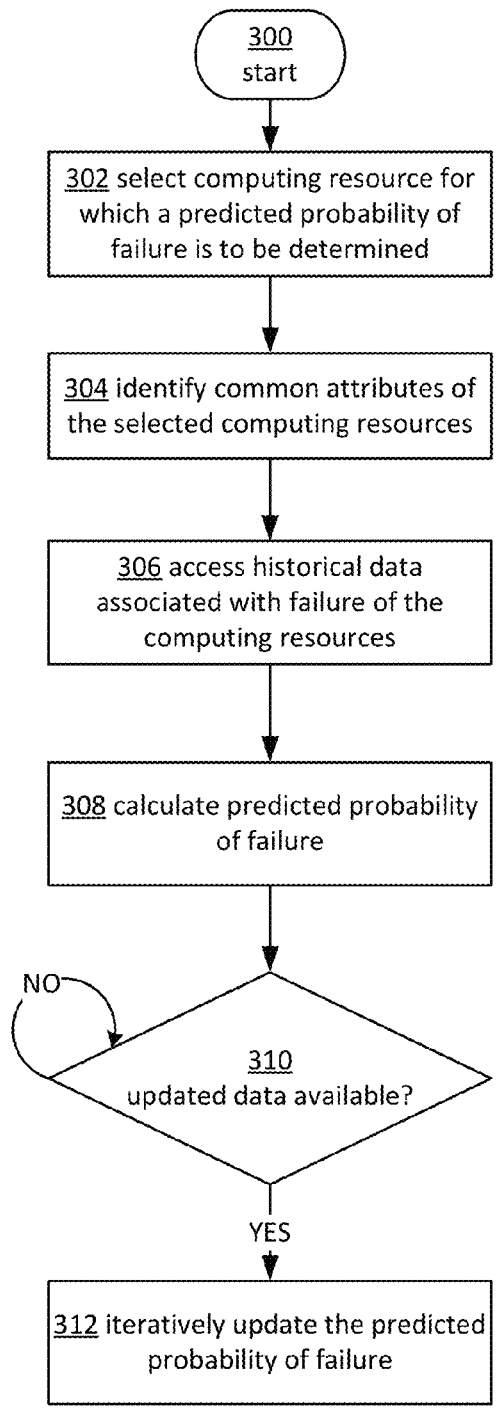
FIG. 3 is a flowchart depicting an example procedure for managing computing resources in accordance with the present disclosure.

FIG. 3 illustrates an example operational procedure for managing computing resources. In an embodiment, a mechanism for providing resource status can be provided by services such as event prediction engine 100 in FIG. 1. The operational procedure may be implemented in a system comprising one or more computing devices. In one embodiment, the system may comprise a computing services platform, such as a multi-tenant Web services platform. Referring to FIG. 3, operation 300 begins the operational procedure. Operation 300 may be followed by operation 302. Operation 302 illustrates selecting one or more computing resources for which a predicted probability of failure is to be determined.

Operation 302 may be followed by operation 304. Operation 304 illustrates identifying common attributes of the selected computing resources.

Operation 304 may be followed by operation 306. Operation 306 illustrates accessing historical data associated with failure of the one or more computing resources. In one embodiment, the historical data may be selected based at least in part on the common attributes. Operation 306 may be followed by operation 308. Operation 308 illustrates calculating the predicted probability of failure based at least in part on the historical data associated with the failure of the one or more computing resources.

Operation 308 may be followed by operation 310. Operation 310 illustrates iteratively determining if updated data associated with the failure of the one or more computing resources becomes available. If updated data associated with the failure of the one or more computing resources becomes available, then operation 310 may be followed by operation 312. Operation 312 illustrates iteratively updating the predicted probability of failure.

In some embodiments, the predicted probability of failure may comprise a probability distribution function. The predicted probability of failure may be calculated using Bayesian analysis. In one embodiment, the predicted probability of failure may be continuously updated as updated data becomes available. For example, the current predicted probability may be recalculated using the current predicted probability as an initial probability, using the available updated data to adjust the initial probability and using the recalculated predicted probability as the new current predicted probability for a subsequent iterative update. In one example implementation, the one or more computing resources may comprise one or more servers of a grouping of servers. The grouping may be determined based on one or more attributes, such as hardware attributes, installed software, physical location, customers associated with the computing resources, and type of the computing resources.

As discussed above, the user interface may be an application programming interface (API) configured to receive first electronic messages that encode identifiers indicative of the request, and, in response to receiving one of the first electronic messages, send second electronic messages indicative of information pertaining to the request.

The above described aspects of the disclosure have been described with regard to certain examples and embodiments, which are intended to illustrate but not to limit the disclosure. It should be appreciated that the subject matter presented herein may be implemented as a computer process, a computer-controlled apparatus or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 4:
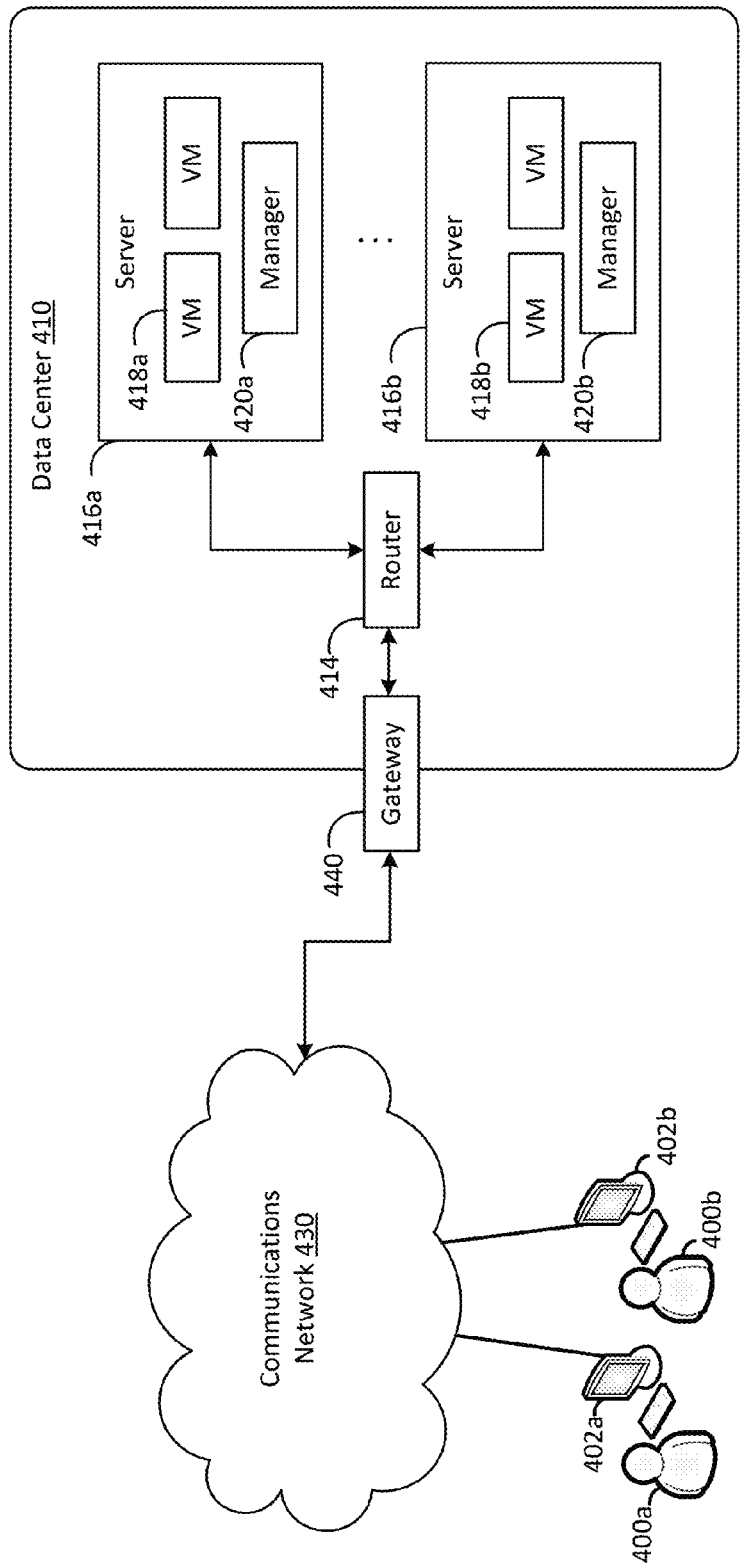
FIG. 4 is a diagram illustrating an example computing system that may be used in some embodiments.

FIG. 4 illustrates an example computing environment in which the embodiments described herein may be implemented. FIG. 4 is a diagram schematically illustrating an example of a data center 410 that can provide computing resources to users 400*a* and 400*b* (which may be referred herein singularly as "a user 400" or in the plural as "the users 400") via user computers 402*a* and 402*b* (which may be referred herein singularly as "a computer 402" or in the plural as "the computers 402") via a communications network 430. Data center 410 may be configured to provide computing resources for executing applications on a permanent or an as-needed basis. The computing resources provided by data center 410 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including Web servers, application servers, media servers, database servers, and the like. Data storage resources may include file storage devices, block storage devices, and the like.

Each type or configuration of computing resource may be available in different sizes, such as large resources, consisting of many processors, large amounts of memory and/or large storage capacity, and small resources consisting of fewer processors, smaller amounts of memory and/or smaller storage capacity. Customers may choose to allocate a number of small processing resources as Web servers and/or one large processing resource as a database server, for example.

Data center 410 may include servers 416*a* and 416*b* (which may be referred herein singularly as "a server 416" or in the plural as "the servers 416") that provide computing resources available as virtual machine instances 418*a* and 418*b* (which may be referred herein singularly as "a virtual machine instance 418" or in the plural as "the virtual machine instances 418"). The virtual machine instances 418 may be configured to execute applications, including Web servers, application servers, media servers, database servers, and the like. Other resources that may be provided include data storage resources (not shown) and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies such as those provided by VMware or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 4, communications network 430 may, for example, be a publicly accessible network of linked networks and possibly operated by various distinct parties, such as the Internet. In other embodiments, communications network 430 may be a private network, such as, for example, a corporate or university network that is wholly or partially inaccessible to non-privileged users. In still other embodiments, communications network 430 may include one or more private networks with access to and/or from the Internet.

Communications network 430 may provide access to computers 402. Computers 402 may be computers utilized by customers 400 or other customers of data center 410. For instance, user computer 402a or 402b may be a server, a desktop or laptop personal computer, a tablet computer, a wireless telephone, a personal digital assistant (PDA), an e-book reader, a game console, a set-top box, or any other computing device capable of accessing data center 410. User computer 402a or 402b may connect directly to the Internet (e.g., via a cable modem or a Digital Subscriber Line (DSL)). Although only two user computers 402a and 402b are depicted, it should be appreciated that there may be multiple user computers.

Computers 402 may also be utilized to configure aspects of the computing resources provided by data center 410. In this regard, data center 410 might provide a Web interface through which aspects of its operation may be configured through the use of a Web browser application program executing on user computer 402. Alternatively, a stand-alone application program executing on user computer 402 might access an application programming interface (API) exposed by data center 410 for performing the configuration operations. Other mechanisms for configuring the operation of the data center 410, including deploying updates to an application, might also be utilized.

Servers 416a and 416b (which may be referred herein singularly as "a server 416" or in the plural as "the servers 416") shown in FIG. 4 may be standard servers configured appropriately for providing the computing resources described above and may provide computing resources for executing one or more applications. In one embodiment, the computing resources may be virtual machine instances 418. In the example of virtual machine instances, each of the servers 416 may be configured to execute an instance manager 420a or 420b (which may be referred herein singularly as "an instance manager 420" or in the plural as "the instance managers 420") capable of executing the virtual machine instances. The instance managers 420 may be a virtual machine monitor (VMM) or another type of program configured to enable the execution of virtual machine instances 418 on servers 416, for example. As discussed above, each of the virtual machine instances 418 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 410 shown in FIG. 4, a router 414 may be utilized to interconnect the servers 416a and 416b. Router 414 may also be connected to gateway 440, which is connected to communications network 430. Router 414 may manage communications within networks in data center 410, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 4 has been greatly simplified and that many more networks and networking devices may be utilized to interconnect the various computing systems disclosed herein. These network topologies and devices should be apparent to those skilled in the art.

It should also be appreciated that data center 410 described in FIG. 4 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of purchased computing resources provided by data center 410 can be scaled in response to demand. In this regard, scaling refers to the process of instantiating (which may also be referred to herein as "launching" or "creating") or terminating (which may also be referred to herein as "descaling") instances of computing resources in response to demand. In this manner, the capacity of resources purchased by a customer of data center 410 can be scaled on-demand.

Auto scaling is one mechanism for scaling computing resources in response to increases or lulls in demand for the resources. Auto scaling allows customers of data center 410 to configure data center 410 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 410.

Data center 410 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, and provide cache warming logic specifying how an application cache should be prepared and other types of information. The deployment component utilizes the customer-provided configuration and cache warming logic to launch, configure and prime new instances of computing resources.

Figure 5:
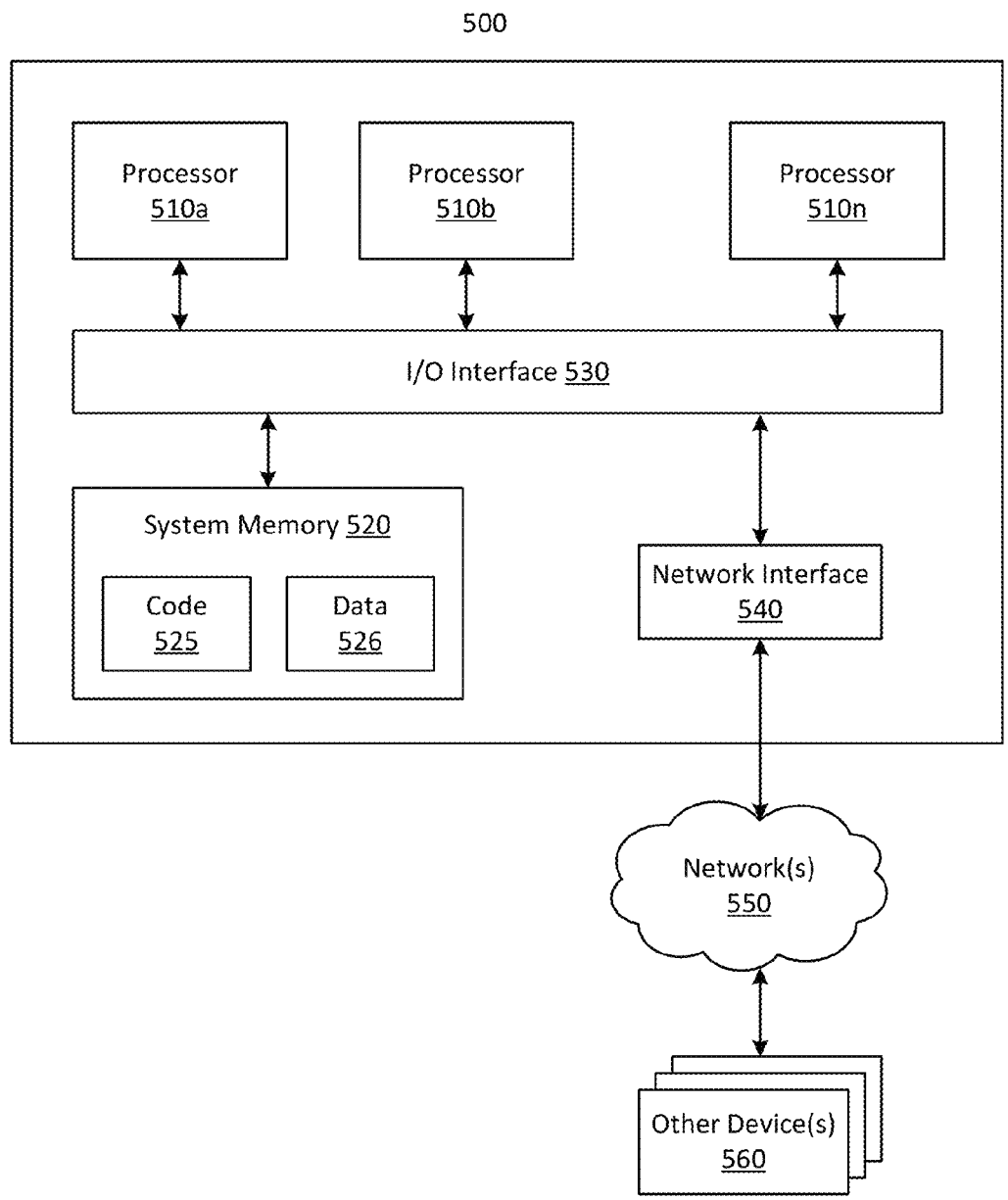
FIG. 5 is a diagram illustrating an example computing system that may be used in some embodiments.

In at least some embodiments, a server that implements a portion or all of one or more of the technologies described herein, including the techniques to implement the functionality of an event prediction engine 100 may include a general-purpose computer system that includes or is configured to access one or more computer-accessible media. FIG. 5 illustrates such a general-purpose computing device 500. In the illustrated embodiment, computing device 500 includes one or more processors 510a, 510b, and/or 510n (which may be referred herein singularly as "a processor 510" or in the plural as "the processors 510") coupled to a system memory 520 via an input/output (I/O) interface 530. Computing device 500 further includes a network interface 540 coupled to I/O interface 530.

In various embodiments, computing device 500 may be a uniprocessor system including one processor 510 or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA.

System memory 520 may be configured to store instructions and data accessible by processor(s) 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 520 as code 525 and data 526.

In one embodiment, I/O interface 530 may be configured to coordinate I/O traffic between processor 510, system memory 520, and any peripheral devices in the device, including network interface 540 or other peripheral interfaces. In some embodiments, I/O interface 530 may perform any necessary protocol, timing, or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computing device 500 and other device or devices 560 attached to a network or network(s) 550, such as other computer systems or devices as illustrated in FIGS. 1 through 4, for example. In various embodiments, network interface 540 may support communication via any suitable wired or wireless general data networks, such as types of Ethernet networks, for example. Additionally, network interface 540 may support communication via telecommunications/telephony networks such as analog voice networks or digital fiber communications networks, via storage area networks such as Fibre Channel SANs or via any other suitable type of network and/or protocol.

In some embodiments, system memory 520 may be one embodiment of a computer-accessible medium configured to store program instructions and data as described above for FIGS. 1-4 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 500 via I/O interface 530. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 500 as system memory 520 or another type of memory. Further, a computer-accessible medium may include transmission media or signals such as electrical, electromagnetic or digital signals, conveyed via a communication medium such as a network and/or a wireless link, such as may be implemented via network interface 540. Portions or all of multiple computing devices, such as those illustrated in FIG. 5, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for managing computing resources, the method comprising:

selecting one or more computing resources for which a predicted probability of failure is to be determined;

identifying common attributes of the selected computing resources;

accessing historical data associated with failure of the one or more computing resources, the historical data selected based at least in part on the common attributes;

calculating the predicted probability of failure based at least in part on the historical data associated with the failure of the one or more computing resources; and iteratively updating the predicted probability of failure as updated data associated with the failure of the one or more computing resources becomes available.

2. The method according to claim 1, wherein the predicted probability of failure comprises a probability distribution function.

3. The method according to claim 1, wherein the iteratively updating the predicted probability of failure comprises recalculating the predicted probability using a current predicted probability as an initial probability, using the available updated data to adjust the initial probability, and using the recalculated predicted probability as the current predicted probability for a subsequent iterative update.

4. The method according to claim 1, wherein the one or more computing resources comprise one or more servers of a grouping of servers, the grouping determined based on one or more of a type of computing resource, hardware attributes, physical location, installed software, and customers associated with the servers.

5. A system configured to manage computing resources, the system comprising:
    at least one memory having stored therein computer instructions that, upon execution by one or more processors of the system, at least cause the system to:
    identify common attributes of one or more computing resources for which a predicted probability of an event associated with the one or more computing resources is to be determined;
    calculate a first predicted probability of the event based at least in part on data associated with actual occurrences of the events; and
    calculate a second predicted probability of the event based at least in part on updated data associated with the event.

6. The system of claim 5, wherein the data associated with actual occurrences of the events is selected based at least in part on the common attributes of the one or more computing resources.

7. The system of claim 6, wherein some common attributes are weighted more based on greater expected relevance to the probability of the event.

8. The system of claim 5, further comprising computer instructions that, upon execution by one or more processors of the system, at least cause the system to iteratively update the second predicted probability of the event as updated data associated with the event becomes available.

9. The system of claim 8, further comprising computer instructions that, upon execution by one or more processors of the system, at least cause the system to iteratively update the second predicted probability based on a learning function.

10. The system of claim 5, wherein the common attributes comprise one or more of metrics, activity logs, health status, configurations, connection states, hardware attributes, physical location, and installed software.

11. The system of claim 5, wherein the common attributes are determined based on computing resources allocated to a customer.

12. The system of claim 5, further comprising computer instructions that, upon execution by one or more processors of the system, at least cause the system to implement an application programming interface (API) configured to:
    receive first electronic messages that encode identifiers indicative of a request for the predicted probability of the event; and
    in response to receiving one of the first electronic messages, send second electronic messages indicative of information pertaining to the request.

13. The system of claim 5, wherein the predicted probability of the event comprises a probability distribution function.

14. The system of claim 5, wherein the event comprises an impairment of the one or more computing resources.

15. The system of claim 14, further comprising computer instructions that, upon execution by one or more processors of the system, at least cause the system to indicate a likely cause for the impairment.

16. The system of claim 15, wherein the second predicted probability is iteratively updated at a specified time interval and incorporates updated data made available during the most recent interval.

17. The system of claim 5, wherein the predicted probability of the event is calculated by recalculating the predicted probability using a current predicted probability as an initial probability, using the updated data to adjust the initial probability, and using the recalculated predicted probability as the current predicted probability for a subsequent predicted probability.

18. The system of claim 5, wherein the one or more computing resources comprise one or more servers of a grouping of servers, the grouping determined based on one or more of a type of computing resource, hardware attributes, physical location, installed software, and customers associated with the servers.

19. The system of claim 5, wherein the updated data comprises whether the event does or does not occur.

20. A non-transitory computer-readable storage medium having stored thereon computer-readable instructions, the computer-readable instructions comprising instructions that upon execution on one or more computing devices, at least cause the one or more computing devices to:
    identify common attributes of one or more computing resources for which a predicted probability of an event associated with the one or more computing resources is to be determined;
    calculate a predicted probability of the event based on historical data associated with the one or more computing resources; and
    iteratively re-calculate the predicted probability of the event based on updated data associated with the event.

* * * * *